United States Patent Office 3,068,211
Patented Dec. 11, 1962

3,068,211
RIGID VINYL CHLORIDE RESINS AND PROCESSES FOR THEIR PRODUCTION
Rudolph D. Deanin, Florham Park, N.J., assignor to Allied Chemical Corporation, New York, N.Y., a corporation of New York
No Drawing. Filed Feb. 12, 1959, Ser. No. 792,710
19 Claims. (Cl. 260—80.5)

This invention relates to a new and improved process for the production of vinyl chloride resins of the rigid type, which are especially adapted to being formed into shaped articles by heat and pressure, as by injection molding, extrusion or calendering without addition to the polymer resin of liquid plasticizers to form plastisols.

It is an object of this invention to provide a process whereby a rigid vinyl chloride polymer may be prepared which is more easily processed by molding, extruding and calendering than rigid polyvinyl chloride resins now supplied for those purposes. The polyvinyl chloride resins produced by the process of this invention have improved processibility; at the same time articles made from them are characterized by having good hardness, thermal stability, heat distortion temperatures and flexural, compression and impact strengths.

It has been proposed (U.S.P. 2,397,724, issued April 2, 1946) to copolymerize vinyl chloride with 1.5%, 3% or 5% trichloroethylene dispersed in water containing a redox catalyst of equal parts ammonium persulfate and sodium bisulfite, at 40° C. to 50° C. It is said polymerization temperatures in the neighborhood of 40° C. to 60° C. are generally suitable.

It has also been proposed (U.S.P. 2,068,424, issued January 19, 1937) to polymerize vinyl chloride alone or together with vinyl acetate dispersed in water containing a dispersing or emulsifying agent and catalyst at between about 35° C. and about 80° C. but preferably at about 40° C. to about 50° C. Various catalysts are disclosed, including inorganic and organic peroxides.

I have discovered that high polymerization temperatures and limited amounts of trichloroethylene in a monomer mixture containing vinyl chloride have a synergistic action in increasing the thermal plasticity of the vinyl chloride polymer and that by conducting the polymerization under the conditions hereinafter described one may utilize this synergistic action to produce vinyl chloride polymers of high thermal plasticity without serious impairment of their other characteristics required of satisfactory rigid vinyl chloride polymers, good thermal stability, flexural strength, compression strength, impact strength, and hardness.

The processes of this invention are characterized by dispersing a liquid monomer mixture essentially composed of vinyl chloride and trichloroethylene but which may contain limited amounts of vinyl acetate or acrylate ester of a monohydroxy alkane (a saturated, monohydric alcohol) containing 1 to 18 carbon atoms, in water containing small amounts of a water-soluble dispersing agent and of organic peroxide polymerization catalyst which promotes the polymerization of the monoethylenically unsaturated monomers present, and maintaining the aqueous dispersion at temperatures ranging from 60° C. to 80° C., preferably from 60° C. to about 70° C., and better yet substantially at 65° C. to 70° C., to form a dispersion of vinyl chloride polymer in the aqueous reaction medium. The trichloroethylene amounts to 0.5% to 5% of the monomer mixture preferably 0.5% to 2%. Further, when employing temperatures below 65° C., it is better to have present at least 1.5% trichloroethylene.

The total of vinyl acetate and acrylate ester, when one or both are present, may amount to 50%, preferably about 1% to about 15% of the monomer mixture. The remainder of the monomer mixture substantially consists of vinyl chloride, which preferably amounts to at least about 80%. (Throughout this specification the percentages of materials employed are in percent by weight of the monomer mixture unless otherwise designated). Monomeric material copolymerizable with vinyl chloride other than those specified above, particularly monoethylenically unsaturated material, may be present in the monomer mixture in small amounts not significantly altering the polymerization characteristics of the monomer mixture or the physical character of shaped articles formed from the polymer resin products of my process. The products obtained by polymerizing a monomer mixture consisting of 1% to 15% vinyl acetate, 0.5% to 2% trichloroethylene and the remainder vinyl chloride at temperatures of 60° C. to about 70° C. have properties making them especially suitable for the production of extruded, molded or calendered products.

Other than employing the materials and reaction conditions specified above, variations in operation of the processes of my invention are within the skill of chemists familiar with vinyl chloride polymerizations.

I prefer to employ lauroyl peroxide amounting to 0.05% to 0.15% of the monomer mixture as the catalyst. However, the organic peroxide polymerization catalysts which are soluble in the monomer mixture and substantially less soluble in water are suitably used in small amount. For example, benzoyl peroxide, acetyl peroxide, the peroxides of the long chain paraffin hydrocarbons, such as stearoyl peroxide or dicaprylyl peroxide, or acetyl benzoyl peroxide. The amount of catalyst may be varied for example, from about .01% to about 1.0% of the monomer mixture. The rate of polymerization is affected by the temperature, catalyst concentration and amount of trichloroethylene in the monomer mixture. Higher temperatures and lower content of trichloroethylene favor high rate of polymerization. Accordingly, with a lower concentration of catalyst the polymerization is initiated and proceeds at a rate which, with lower temperatures or higher content of trichloroethylene would require a higher concentration of catalyst. I have found catalysts other than the organic peroxides are not suitable. Thus, employing a persulfate-bisulfite catalyst in place of an organic peroxide was found to result in the production of a vinyl chloride polymer of unduly low thermal stability.

With respect to the dispersant, in operating in accordance with my invention the monomer mixture is polymerized, dispersed by stirring or otherwise agitating the polymerization mixture, in water containing a water-soluble hydrophilic colloid dispersing agent in the small amounts which are customarily used to maintain the monomers and polymer as a dispersion of small liquid globules and finely granular solid, respectively, in the aqueous medium. Suitable hydrophilic colloids are, for example, the water-soluble polyvinyl alcohols, methyl or ethyl ethers of polysaccharides, e.g. methyl cellulose or methyl starch, hydroxy ethyl cellulose, carboxymethyl cellulose, gelatin or starch. They may be used together with small amounts of water-soluble emulsifiers, such as the alkali metal or ammonium salts of the higher fatty acids (soaps), alkyl-aryl sulfonates, alkyl naphthalene sulfonates, high molecular weight alkyl sulfonates or sulfate esters of long chain alkanols, etc. In general the total amount of dispersant used for these suspension polymerization ranges from about 0.01% to about 1.5%. It is better to employ about 0.05% to 1% of a water-soluble colloid, preferably 0.05% to about 0.5%, of a water soluble colloid together with 0.01% to 0.5% of a water soluble emulsifier. With these amounts of dispersant present and adequate agitation of the polymerization mixture, a suitably finely granular polymer suspension is obtained. I prefer to employ a mixed dispersant of about 0.05% to about 0.5% of a water soluble methyl cellulose together with 0.01% to 0.1% ammonium stearate or 0.05% to 0.25% of an alkyl aryl sulfonate in which the aryl nucleus is a benzene or toluene nucleus containing a single $C_{10}$ to $C_{20}$ alkyl substituent. Particularly in polymerizing a monomer mixture containing both vinyl chloride and vinyl acetate or acrylate ester, I prefer to employ both the colloidal dispersant and the emulsifier, and furthermore, better results with respect to uniformity of the polymer dispersion and avoiding precoagulation on the surfaces of the polymerization vessel are obtained when the amount of the emulsifier which is present is no greater than the amount of the colloidal dispersant which is present.

I have discovered the novel process herein described produces a rigid type vinyl chloride polymer of unexpectedly high thermal plasticity, and hence easily processed by extrusion, injection molding and calendering operations without addition of plasticizers commonly mixed with polyvinyl chloride to form plastisols of suitable plasticity for being thus formed into the desired structures. The products of my invention do not form plastisols with those plasticizers. However, they may be compounded with other materials, such as nitrile rubbers, before being shaped under pressure as is done with other rigid type vinyl chloride polymers.

The synergistic effect of temperature and trichloroethylene in increasing the thermal plasticity of vinyl chloride polymers is shown by a series of polymerizations run to substantial completion of the polymerization at 50° C. (48 hours), at 60° C. (24 hours) and at 70° C. (12 hours), with amounts of trichloroethylene varied from 0% to 10% of the vinyl chloride monomer for the runs at 50° and 60° C. and from 0% to 5% of the vinyl chloride monomer for the runs at 70° C. Except for these variations, the materials and procedures were as follows:

Materials (in parts by weight):

| | |
|---|---|
| Water | 200 |
| Methyl cellulose | 0.3 |
| Emulsifier [1] | 0.2 |
| Lauroyl peroxide | 0.2 |
| Vinyl chloride | 100 |
| Trichloroethylene | varied |

[1] (A low salt content mononuclear $C_{10}$-$C_{20}$ alkyl benzene sulfonate marketed under the trademark "Nacconol NRSF.")

PROCEDURE

To a solution in the water of the methyl cellulose, emulsifier, and lauroyl peroxide in a stainless steel bomb, liquid vinyl chloride, in slight excess of the 100 parts, and trichloroethylene, when used, were added. The excess vinyl chloride was evaporated to remove air from the bomb, which was then closed and tumbled end-over-end at the required temperature until polymerization was completed. The polymer was recovered by filtration, washed with water and dried.

The thermal plasticities of rigid vinyl chloride polymers are a measure of their processability in pressing the particulate resin into shaped articles at suitably elevated temperatures, as in extrusion, injection molding and calendering. The thermal plasticity data given in this specification were determined by pressing ½ gram samples of the powdered resin between two cellophane sheets for 30 seconds at a suitable, elevated temperature (which may differ for different resins, and is, therefore, stated in reporting the values for thermal plasticities) under 9000 p.s.i., cooling under pressure and measuring the area of the fused resin. The numerical values for thermal plasticity are reported in square millimeters. The following Table I shows the values thus obtained for thermal plasticity of the vinyl chloride resins prepared by the foregoing processes.

*Table I*

| Percent Trichloroethylene | Temperature | | |
|---|---|---|---|
| | 50° C. | 60° C. | 70° C. |
| | Thermal Plasticity (190° C.) | | |
| 0.0 | 2,195 | 2,830 | 3,700 |
| 1.0 | 2,540 | 3,300 | 4,950 |
| 2.5 | 3,120 | 4,050 | 4,960 |
| 5.0 | 4,450 | 6,250 | 7,400 |
| 7.5 | 5,610 | 7,160 | |
| 10.0 | 6,470 | 8,230 | |

When the data of this table are analyzed graphically and mathematically, the following equation is derived for the observed values of thermal plasticity, represented by TP, for the combined increase in temperature, $\Delta T$, and percent trichloroethylene, TCE, $$TP = 2195 + 439(TCE) + 75(\Delta T) + (TCE)\Delta T^2$$

The synergistic effect of the combined use of higher temperatures and trichloroethylene is equal to the term $(TCE)\Delta T^2$ in this equation.

The vinyl chloride polymers of my invention are characterized by having thermal plasticities greater than 3,000 mm.$^2$ at 190° C. which, being produced by the herein described processes, also have the other physical characteristics required of rigid vinyl chloride polymers.

My invention is further illustrated by the following specific procedures for operating my novel process to best advantage as concerns the character of the rigid vinyl chloride polymers which are thus produced.

*Examples 1–3.*—A glass lined, steel polymerization vessel is charged with 246 pounds deionized and deaerated water, a solution of 62 gms. methyl cellulose in 2 liters of water, 57 cc. of 28% ammonium hydroxide, 28 gms. stearic acid, 57 gms. lauroyl peroxide and 567 gms. trichloroethylene. Air is removed from the reactor by adding 5 pounds liquid vinyl chloride and allowing it to evaporate and escape carrying with it the air. Liquid vinyl chloride, 125 pounds, is then introduced under pressure and the contents of the sealed reactor stirred to disperse the vinyl chloride in the aqueous reaction medium. The stirring is continued while the contents of the reactor are heated to and maintained at 65° C. until the pressure in the reactor, initially 145 p.s.i.g., drops to 40 p.s.i.g., signaling substantial completion of the polymerization at the end of 10¾ hours. The aqueous dispersion of finely divided vinyl chloride resin is centrifuged, the resin washed with water and dried in an air oven at 72° C.

In carrying out a process exactly as described 124 pounds of resin was obtained, only 1% of which was retained on a 40 mesh screen. The 567 gm. trichloroethylene employed corresponded to 1% of the monomer mixture. The 62 gms. methyl cellulose, the 28 gms. stearic acid, with the ammonia added, and the 57 gms. lauroyl peroxide corresponded to 0.11% methyl cellulose, 0.05% ammonium stearate and 0.10% lauroyl peroxide, all by weight of the monomer mixture.

This procedure was repeated except for varying the amounts of trichloroethylene and catalyst to employ 0.5% trichloroethylene with 0.08% lauroyl peroxide and 1.5% trichloroethylene with 0.11% lauroyl peroxide.

The properties of the vinyl chloride resins obtained in these three runs are shown in the following table.

|  | Trichloroethylene Concentration | | |
|---|---|---|---|
|  | 0.5% | 1% | 1.5% |
| Thermal Plasticity (190° C.) | 3,120 | 3,280 | 3,680 |
| Thermal Stability | 26 | 26 | 73 |
| Heat Distortion Temperature, ° C. | 73 | 73 | 73 |
| Rockwell Hardness | M69 | M70 | M70 |
| Strengths: |  |  |  |
| Flexural | 14,000 | 14,000 | 8,000 |
| Compressive | 10,000 | 10,000 | 11,000 |
| Impact | 0.21 | 0.22 | 0.18 |

Thermal plasticity was determined as described above at 190° C. Thermal stability was determined by heating milled sheets of the resins at 175° C., comparing them with a standard color series at intervals of 0, 8, 15, 30, 60, and 120 minutes from the start of heating and totalling the color numbers thus obtained to obtain the thermal stability number. The higher the color number, the lower the thermal stability. The other data were obtained by molding and testing according to American Society for Testing Materials methods and are reported in terms of lbs./sq. inch for flexural and compressive strengths and ft.-lbs./inch of notch for impact strength.

*Example 4.*—A polymerization vessel was charged with 67 pounds water, a solution of 55 gms. methyl cellulose in 4 liters water, 36 gms. "Nacconol NRSF" in 2 liters water, 36 gms. lauroyl peroxide, 272 gms. trichloroethylene and 5.2 pounds vinyl acetate monomer. Air was removed by adding vinyl chloride and letting it evaporate. The vessel was then charged with 35 pounds liquid vinyl chloride and its contents stirred to disperse the monomers in the aqueous medium. The dispersion was heated to and maintained at 65° C. for 10½ hours. The finely divided polymer thus obtained, was recovered from the aqueous reaction medium and dried as described for Examples 1–3.

In this example the following amounts of materials were present, based on the total monomer; 0.3% methyl cellulose, 0.2% "Nacconol NRSF" and 0.2% lauroyl peroxide. The monomer mixture contained 1.5% trichloroethylene, and about a 13/87 weight ratio of vinyl acetate to vinyl chloride.

The copolymer product had the following characteristics:

Thermal plasticity (165° C.) _____ [1] 3550
Thermal stability _____ 25
Heat distortion temperature, ° C. _____ 67
Rockwell hardness _____ M60
Strengths:
  Flexural _____ 10,000
  Compressive _____ 11,000
  Impact _____ 0.22

[1] Equivalent to about 6,000 at 190° C.

*Examples 5–7.*—A polymerization mixture was prepared containing (in parts by weight):

Water _____ 200
Methyl cellulose _____ 0.3
"Nacconol NRSF" _____ 0.2
Lauroyl peroxide _____ 0.2
Trichloroethylene _____ 1
Methyl acrylate _____ 25
Vinyl chloride _____ 75

This mixture in a closed bomb under the pressures generated by the liquid monomers and aqueous solution present, and while being tumbled to maintain the monomers dispersed in the aqueous solution, was heated to and maintained at 70° C. for 12 hours. The resulting copolymer product was recovered by filtration and dried.

This procedure was repeated employing the same polymerization conditions and materials except for the amount of trichloroethylene, which in one case was omitted entirely and in another amounted to 2.5 parts.

The products of these runs had the following thermal plasticities at 190° C.

|  | Parts Trichloroethylene | | |
|---|---|---|---|
|  | 0 | 1 | 2.5 |
| Thermal Plasticity (190° C.) | 4,400 | 5,500 | 6,450 |

With reference to the polymers of the above Table I prepared employing 1.0% trichloroethylene in the monomer mixture at temperatures of 50° C., 60° C. and 70° C., their thermal stabilities were 26, 25½ and 25 respectively. For comparison with the thermal stabilities of these polymers and those of above examples prepared with trichloroethylene, the thermal stability of the polymer of Table I prepared at 50° C. with no trichloroethylene present, was 26.

I claim:
1. In a process for polymerizing vinyl chloride dispersed as small globules in water containing small amounts of a dispersing agent and of a polymerization catalyst to form a finely granular vinyl chloride polymer dispersion, the improvement which comprises dispersing in water a liquid monomer mixture essentially composed of vinyl chloride and trichloroethylene and containing no more than 50 weight percent of other monomers from the group consisting of vinyl acetate and acrylate ester of a monohydroxy alkane containing 1 to 18 carbon atoms, the trichloroethylene amounting to 0.5% to 5% by weight of the monomer mixture, the monomer selected from the group consisting of vinyl acetate and acrylate ester amounting to no more than 50% by weight of the monomer mixture, and the remainder substantially consisting of vinyl chloride, said water containing small amounts of a water soluble hydrophilic colloid dispersing agent and of an organic peroxide polymerization catalyst soluble in the monomer mixture and substantially less soluble in water, and maintaining the dispersion of monomers in water at temperatures in the range 60° C. to 80° C. to form an aqueous dispersion of finely granular rigid vinyl chloride polymer adapted to be formed by pressure into shaped articles without addition of liquid plasticizers.

2. The process of claim 1 in which the dispersion of monomers in water is maintained at temperatures in the range 60° C. to about 70° C. to form the polymer dispersion.

3. The process of claim 1 in which the dispersion of monomers in water contains no more than 15% by weight of the monomer mixture of total vinyl acetate and acrylate ester.

4. The process of claim 1 in which the monomer mixture contains 0.5% to 2% by weight of trichloroethylene.

5. The process of claim 1 in which the water soluble dispersing agent amounts to about 0.01% to about 1.5% and the organic peroxide catalyst amounts to about .01% to about 1%, both by weight of the monomer mixture.

6. The process of claim 3 in which the monomer mixture contains 0.5% to 2% by weight of trichloroethylene and the water soluble dispersing agent amounts to about 0.01% to about 1.5% and the organic peroxide catalyst amounts to about .01% to about 1%, both by weight of the monomer mixture.

7. The process of claim 3 in which the monomer mixture consists of vinyl chloride and 0.5% to 2% trichloroethylene by weight of the monomer mixture and the water soluble dispersing agent amounts to 0.05% to 1% by weight of the monomer mixture.

8. The process of claim 5 in which the monomer mixture consists of vinyl chloride and, by weight of the monomer mixture, 0.5% to 5% trichloroethylene and a total of about 1% to about 15% of monomer from the group consisting of vinyl acetate and an acrylate ester of a monohydroxy alkane containing 1 to 18 carbon atoms, and the water soluble dispersing agent is a mixture of a water soluble hydrophilic colloid amounting to about 0.05% to about 1% and a water soluble emulsifying agent amounting to 0.01% to 0.5%, both by weight of the monomer mixture.

9. The process of claim 7 in which the monomer mixture contains 0.5% to 0.2% trichloroethylene and the aqueous dispersion is maintained at temperatures ranging from 60° C. to about 70° C.

10. The process of claim 8 in which the hydrophilic colloid amounts to about 0.05% to about 0.5% and the emulsifying agent is in the range 0.01% to 0.5%, both by weight of the monomer mixture, with said emulsifying agent being present in an amount no greater than the amount of said hydrophilic colloid.

11. The process of claim 10 in which the monomer mixture consists of vinyl chloride and, by weight of the monomer mixture, 0.5% to 2% trichloroethylene and 1% to 15% vinyl acetate and the aqueous dispersion is maintained at temperatures ranging from 60° C. to about 70° C.

12. The process of claim 10 in which the monomer mixture consists of vinyl chloride and, by weight of the monomer mixture, 0.5% to 2% trichloroethylene and 1% to 15% methyl acrylate and the aqueous dispersion is maintained at temperatures ranging from 60° C. to about 70° C.

13. A finely granular, rigid type vinyl chloride resin produced by the process of claim 1 and characterized by having a thermal plasticity greater than 3,000 at 190° C. and adapted to being formed by pressure into shaped structures in the absence of plastisol forming plasticizers.

14. A finely granular, rigid type vinyl chloride resin produced by the process of claim 4 and characterized by having a thermal plasticity greater than 3,000 at 190° C. and adapted to being formed by pressure into shaped structures in the absence of plastisol forming plasticizers.

15. A finely granular, rigid type vinyl chloride resin produced by the process of claim 6 and characterized by having a thermal plasticity greater than 3,000 at 190° C. and adapted to being formed by pressure into shaped structures in the absence of plastisol forming plasticizers.

16. A finely granular, rigid type vinyl chloride resin produced by the process of claim 7 and characterized by having a thermal plasticity greater than 3,000 at 190° C. and adapted to being formed by pressure into shaped structures in the absence of plastisol forming plasticizers.

17. A finely granular, rigid type vinyl chloride resin produced by the process of claim 9 and characterized by having a thermal plasticity greater than 3,000 at 190° C. and adapted to being formed by pressure into shaped structures in the absence of plastisol forming plasticizers.

18. A finely granular, rigid type vinyl chloride resin produced by the process of claim 11 and characterized by having a thermal plasticity greater than 3,000 at 190° C. and adapted to being formed by pressure into shaped structures in the absence of plastisol forming plasticizers.

19. A finely granular, rigid type vinyl chloride resin produced by the process of claim 12 and characterized by having a thermal plasticity greater than 3,000 at 190° C. and adapted to being formed by pressure into shaped structures in the absence of plastisol forming plasticizers.

References Cited in the file of this patent

UNITED STATES PATENTS

| | | |
|---|---|---|
| 2,068,424 | Mark et al. | Jan. 19, 1937 |
| 2,179,040 | Heuer | Nov. 7, 1939 |
| 2,626,252 | Tawney | Jan. 20, 1953 |
| 2,862,913 | Lynn et al. | Dec. 22, 1958 |
| 2,917,494 | Martin et al. | Dec. 15, 1959 |

UNITED STATES PATENT OFFICE
CERTIFICATE OF CORRECTION

Patent No. 3,068,211                              December 11, 1962

Rudolph D. Deanin

It is hereby certified that error appears in the above numbered patent requiring correction and that the said Letters Patent should read as corrected below.

Column 4, Table 1, fourth column, line 3 thereof, for "4,960" read -- 5,960 --.

Signed and sealed this 20th day of August 1963.

(SEAL)
Attest:

ERNEST W. SWIDER
Attesting Officer

DAVID L. LADD
Commissioner of Patents